Patented Feb. 25, 1947

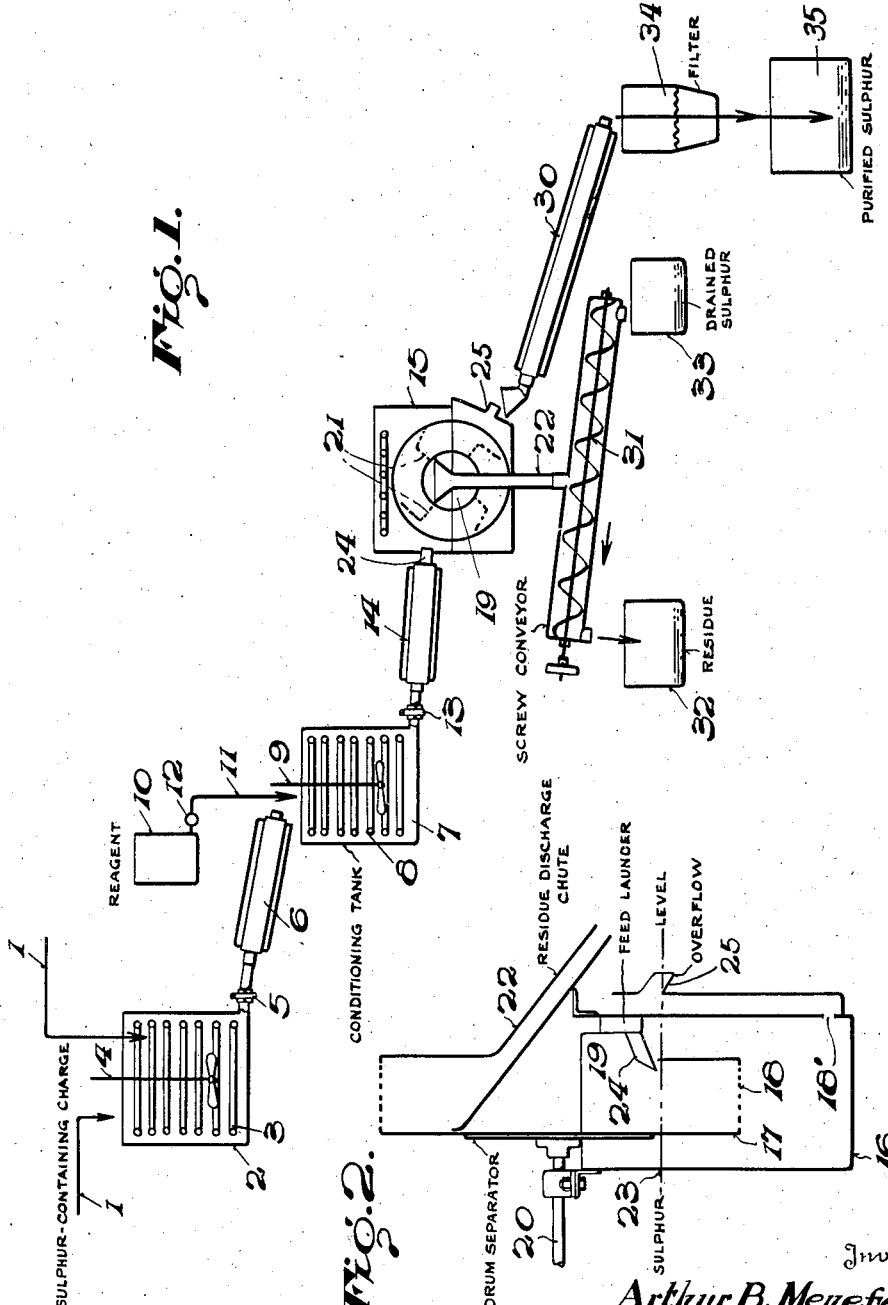

2,416,663

UNITED STATES PATENT OFFICE 2,416,663

PROCESS OF PRODUCING SULPHUR AND FERTILIZERS

Arthur B. Menefee, Cumberstone, Md., and Herbert H. Greger, Washington, D. C.

Original application April 26, 1941, Serial No. 390,622. Divided and this application December 18, 1941, Serial No. 423,544

9 Claims. (Cl. 23—224)

This invention relates to the processing of sulphur-containing materials to produce brimstone sulphur and other valuable products. This application is a division of prior application Serial No. 390,622, filed April 26, 1941.

It has been discovered that sulphur which is associated with organic and inorganic impurities may be separated from such impurities by a unique method. As explained fully in copending applications Serial Nos. 382,844 and 382,845, filed March 11, 1941, this method essentially involves heating the sulphur-containing material, such as an ore or concentrate, in contact with a wetting agent which preferentially wets the non-sulphur particles. As pointed out in application, Serial No. 382,845, when a suitable reagent is utilized and employed in the proper ratio to the gangue, or non-sulphur material, and the mass is agitated under the proper conditions, it is possible to liquefy the sulphur, flocculate the gangue and to cohere the floccules into larger agglomerates of high mechanical strength and substantially uniform size of the order of from $\frac{1}{64}$ to about $\frac{1}{8}$ inch in diameter. As explained in such prior applications and in copending application Serial No. 384,508, filed March 21, 1941, when conditions are properly controlled so as to produce agglomerates of optimum size, the molten sulphur not only flows freely from the agglomerated gangue but the gangue agglomerates themselves also serve as a particularly effective filtering medium so that the agglomerates function as a continuously renewing filtering bed which filters out the dispersed smaller gangue particles.

As explained in the copending applications referred to, the wetting or agglomerating agent may consist of any material which is insoluble in molten sulphur, which preferentially wets and agglomerates the gangue and which can be retained in liquid phase under the conditions of the operation. Among such agents are sulphuric and phosphoric acids, hydrated salts, such as calcium chloride, magnesium chloride, zinc chloride and the like. Of these sulphuric acid, and particularly sulphuric acid of 98% strength, is in many circumstances the preferred reagent not only because of its efficacy as an agglomerating medium but also because it decolorizes the sulphur.

As explained in the copending applications referred to, the molten sulphur phase may be separated from the agglomerate phase by a number of different methods, as for example simple draining on a screen, as explained in copending application Serial No. 382,845. This separation may also be effected rapidly by means of a continuous centrifuge as explained in the copending application Serial No. 390,623, filed April 26, 1941.

In further study of this novel system it has been found that the principle of wetting the non-sulphur particles may be invoked to the extent of utilizing other specific wetting agents such as organic liquids. It is further found that during the extraction and/or decolorizing of sulphur it is possible to utilize this principle of agglomeration while achieving other advantages, as for example by producing a residue of agglomerates which have a technical value.

In order more clearly to explain the invention there is shown in the accompanying drawings a diagrammatic illustration of an apparatus in which it may be carried out in which Figure I is a flow sheet of a typical unit and Figure II is a sectional view of the separator employed.

In the copending applications referred to, the preferred agglomerating agents mentioned comprised solutions of mineral acids and hydrated salts. In further experimentation it has been discovered that the broad idea of extracting sulphur by agglomeration of the non-sulphur material may be operated utilizing other agglomerated materials, more particularly organic materials.

It has been established that molten sulphur, at temperatures below the viscous range, i. e. 320° F., will react with only a predetermined quantity of organic materials, such as oils. Tests carried out in which mineral oil was contacted with purified molten sulphur at such elevated temperature demonstrated that the sulphur picks up only approximately 0.2% of such oil. This amount discolors the sulphur but such sulphur may readily be decolorized in any suitable manner, as for example by the method described in copending application Serial No. 384,508. The fact that molten sulphur picks up such minimal quantities of an organic presents the definite possibility of utilizing organics as agglomerating media for the main separation of sulphur from associated impurities. It has been found that an oil in the presence of molten sulphur containing an inorganic impurity, such as opalescent silica, preferentially wets the silica and is not wetted by the molten sulphur.

This finding that certain organic substances which do not react to any substantial degree with molten sulphur have the power of preferentially wetting the non-sulphur material, establishes the possibility of utilizing such materials in the unique agglomeration method of separating sulphur. The commercial efficacy of such a method is indicated in the following test:

Example

One hundred pounds of purified sulphur was melted in a steam jacketed kettle and to the molten mass there was added three pounds of reclaimed siliceous gangue of 65 mesh. This gangue had been separated as agglomerates in the treatment of Chilean concentrates in accordance with the process described in copending application Serial No. 382,845. The reclaimed gangue had been heated to drive off the sulphuric acid and sulphur. The molten sulphur and gangue were agitated with a ¼ H. P. 1700 R. P. M. "Lightnin" mixer. To this mix there was added 1.75 pounds of a medium motor cylinder paraffinic oil (Booster motor oil). The mass was agitated for ten minutes during which period the silica gangue was rather soft. On stopping the agitator the oil-collected material rose to the surface of the mix. Thereupon an additional 1.25 pounds of gangue was added (total of 4.25 pounds) and the material was further agitated for a short period. The agglomerates of from 1/64 to 1/32 inch in diameter were formed from which the molten sulphur readily drained on an 8 mesh screen. The separated sulphur was filtered through rock wool and the filtrate recovered was of a good color.

As a result of this and similar tests it was determined that sulphur could be separated from associated impurities by agglomerating these impurities with organic media of the type described. In processes using paraffinic oils of the character mentioned a ratio of about four pounds of the impurities to about 1.75 pounds of the oil produces readily separable agglomerates.

The utilization of organics of this character for agglomeration enables a novel method for treating the residues. It is found that in an aqueous medium such oil wets the solid particles of elemental sulphur preferentially to the dispersed particles of the gangue. As explained in the earlier cases referred to, the agglomeration residues generally contain on the order of about 30% of sulphur (dry basis) which may be recovered by flotation treatment. The oil-agglomerate residue may be leached or washed with a low boiling solvent for the oil so as to remove the oil.

The sulphur produced according to the above method may be decolorized by any desired method, as for example by treatment with 98% sulphuric acid in the presence of inorganic collecting agents as described in copending application Serial No. 384,508.

As indicated previously, the unique method of separating the sulphur from associated impurities by utilizing specific agglomerating reagents may be invoked to produce valuable by-products. As explained in copending application Serial No. 384,508, off-colored sulphur may be purified by utilizing as collecting agents such materials as silicates and the like. These materials which contain a reactive base will react with the sulphuric acid to form a sulphate and simultaneously to form silica gel in situ. This latter, being an excellent adsorbent, serves to assist in decolorizing the sulphur. In utilizing such reactive collectors, it will be understood that the acid which is added must not only be sufficient for agglomeration but also adequate to satisfy the reaction involved. It has been found, for example, when kaolinite, which is thoroughly dried or partially calcined, is added to molten, off-colored sulphur and is agitated with 98% sulphuric acid, a very brilliant canary yellow sulphur is produced and exceptionally firm agglomerates are formed from which the molten sulphur drains readily. It appears that in this treatment a certain quantity of the acid reacts with both the organic in the sulphur and part of the aluminum oxide in the clay to produce aluminum sulphate and silica gel. The aluminum sulphate possesses good cementing properties and imparts superior firmness to the agglomerates.

In further experimentation with this type of collecting agent it has been found that reactive agents may be employed which serve not only as collectors for inorganic material in the molten bath but which also react to produce valuable by-products.

Of this type of treatment that employing raw or calcined rock or phosphate rock concentrates are particularly valuable because the residue produced contains available phosphates and elemental sulphur which are advantageous as fertilizers. In carrying out such an operation the phosphate rock or concentrate may be utilized to decolorize off-colored sulphur using it as a collecting agent in a manner described in copending application Serial No. 384,508. The sulphuric acid which is employed is that amount necessary to react with the tri-calcium phosphate to produce the mono and/or di-calcium phosphate plus an amount of free acid sufficient to effect agglomeration. The agglomerates formed may be separated from the molten sulphur and the pelleted material may be used directly as a fertilizer. This residue constitutes a phosphate-containing product in the form of firm agglomerates or pellets of substantially uniform size. This material may be produced substantially acid free or with an excess of acid. If desired the excess acid may be neutralized by treating with lime or if additional fertilizer components are desired the neutralization may be effected with ammoniacal materials.

Within the concept of the invention there may also be employed other minerals, salts or compounds, such for example as greensand, which contain potassium. Under the conditions of the agglomeration treatment, with sufficient excess acid being present, potassium sulphate is formed and the residue comprised of the pellets may be used as a fertilizer in admixture with pellets containing available phosphate. Again such pellets may be leached and the potassium sulphate recovered for use in fertilizers or for other purposes. Similarly the decolorizing of sulphur may be effected by utilizing as a collecting agent a mixture of a phosphate-containing and potassium-containing material so as to produce a purified sulphur and spherical particles of substantially uniform size containing assimilable phosphate and potassium.

It will be appreciated that the above described method presents the possibility of producing various types of valuable fertilizing compositions. For example, a residue from a sulphur decolorizing treatment which comprises pellets containing available phosphate and elemental sulphur, with some free acid, may be mixed with either tri-calcium phosphate or greensand or other materials containing potentially available fertilizing constituents. During storage or after application to the soil the free acid or the decomposition products of the elemental sulphur is utilized to convert the greensand or the tri-calcium phosphate to a form available for plant nutrition.

The agglomerates which are produced by any of the methods hereinbefore described may be separated from the molten sulphur in any desired manner. Such separation may be effected in a continuous centrifugal separator in the manner described in the copending application filed on even date herewith. Again the above described processes may be carried out so as to produce substantially uniform sized pellets or spherical units which may be discharged to a simple, screen-bottom container as described in copending application Serial No. 382,845. Such agglomerates may be separated from the associated molten sulphur in any other desired manner as for example in a rotary drum separator as shown in the drawings.

In carrying out the process the sulphur-containing material to be treated is charged through a line 1 to the melting tank 2. The material to be treated may comprise, for example a dewatered flotation concentrate produced from sulphur-containing ore or any other material which is to be treated, such as off-colored sulphur. The melting tank 2 is constructed of suitable corrosion-resistant material and is of a size adequate to fulfill the requirements of a particular installation. This may be a square or oblong tank and is preferably provided with one inclined side set on an angle of approximately 60 degrees so as to insure proper circulatory motion of the fluids within the container. The container is provided with the steam heating coils 3, the area of which is sufficient to supply the heat required to melt the sulphur and, in the case of concentrates, to substantially dehydrate the material. The container is provided with the agitating mechanism 4 so as to insure thorough mixing and facilitate dehydration. In the event the process is to be operated for the production of residues having fertilizer values the phosphate-containing or potassium-containing material may be admitted in a mixture with the sulphur-containing charge through line 1, or may be admitted to tank 2 through the separate charge line 1'. As will be appreciated, such material may be added to the molten mix in the conditioner 7 in lieu of the melting tank 2.

The container 2 is connected through the steam jacketed valve 5 and steam jacketed line 6 to the conditioning tank 7. This tank is of the same type as tank 2 and is provided with the heating coils 8 and the agitator 9.

Associated with the conditioning tank 7 is a source of supply for the agglomerating reagent. This may comprise the tank 10 from which the reagent is fed to the conditioner 7 through the line 11 controlled by valve 12. As described hereinbefore, the reagent may comprise a mineral acid, such as a sulphuric or phosphoric acid of required strength or other agglomerating reagent, such as a stable mineral oil having a boiling point above the melting point of sulphur. The agglomerating reagent is added to the molten material in the conditioning tank 7 in the quantities required to form agglomerates of the desired size ranging from approximately 1/64 inch to 1/8 inch in diameter in accordance with the principles fully explained in application Serial No. 382,845.

In any particular installation a series of two or more conditioning units 7 may be employed. These may be discharged sequentially so as to insure a substantially continuous operation.

The material undergoing treatment in conditioner 7 and which, after treatment, comprises molten sulphur and associated agglomerated impurities, is discharged through the steam jacketed valve 13 and steam jacketed line 14 to a simple drum separator 15. As shown, this separator consists essentially of a reservoir compartment 16 in which the rotating drum 17 operates. The rotating drum is provided with the peripheral screen 18 and is formed with a partially open side 19. The drum is connected to the driving shaft 20 which is suitably mounted on the compartment 16. The drum is provided with the angular lifting screens 21 which serve to continuously skim agglomerated material from the entering charge and to elevate these for discharge. The separator is provided with heating means to retain the sulphur in molten condition. This may take the form of heating coils positioned between the peripheral edge of the screen and the cover together with immersion heaters if desired.

As shown particularly in Figure 2, a residue discharge chute 22 is suitably mounted on the base and is adapted to receive the elevated agglomerated pellets removed from the bath by the screens 21. As shown in Figure 2, a predetermined liquid level of molten sulphur is maintained in the reservoir as indicated by the dotted line 23. The discharge line 14, as shown in Figure 1, is connected to the feed launder 24 so that material to be filtered or separated is discharged from jacketed line 14 into the confines of the rotary drum separator.

The molten sulphur which drains through the peripheral screen 18' then overflows through line 25 and passes through the steam jacketed line 30 and is discharged from the system. This product may be passed directly to storage or may be mediately or immediately passed to a unit in which it is decolorized.

The solids or residue from the drum separator are passed by the chute 22 to the continuous spiral conveyor 31. This conveyor preferably is steam jacketed. The inclined screw conveyor carries the solids upwardly as indicated by the arrow and such solids are discharged to the container 32. When the collecting material in the sulphur separation step is a phosphate or similar material the discharged residue may be recovered as such and utilized as a fertilizer or may be admixed with other fertilizing ingredients in the manner described. When such residue is produced from an agglomeration treatment utilizing oil as the agglomerating medium it may be treated in the manner previously described, so as to effect a separation and recovery of its contained sulphur.

The free molten sulphur adhering to the agglomerates discharged to the conveyor 31 gravitates downwardly in the conveyor and are collected in container 33. This sulphur may be added to that discharged through line 30 and subjected to the same treatment.

It has been found that when the proper agglomerating reagent is employed and the ratio of reagent to collecting material properly adjusted, agglomerates which are readily separable in the drum separator are produced. Preferably the drum is rotated slowly, i. e. of the order of one-half to one or more R. P. M. In these circumstances adequate time is permitted for draining the molten sulphur from the masses of agglomerates which are continuously elevated by the lifting screens. The sulphur produced in this manner is clear and remarkably free from dispersed gangue; particularly is this true when sulphuric acid is employed as the agglomerating reagent in amounts sufficient to produce agglomerated particles of about one-eighth inch in diameter. In the event that the sulphur discharged through line 30 does contain some dispersed gangue particles these may readily be filtered out by passing the molten sulphur through a suitable filter bed 34 and the purified sulphur collected in container 35.

This type of operation, utilizing the drum separator, enables a simple and rapid separation of molten sulphur from associated agglomerated gangue. The apparatus is eminently simple and economical to operate.

It will be seen that the methods described herein are eminently novel and useful. By the described methods sulphur fulfilling most rigid specifications may be produced from crude or waste sulphur-containing material utilizing effective and inexpensive agents. In certain circumstances the reagent employed may be utilized to subserve the additional advantage of reacting with the collecting material to produce reaction products of considerable value while subserving the main function of purifying sulphur.

While preferred embodiments of the invention have been described it is to be understood that these are given didactically to illustrate the fundamental principles involved and not as indicating any exclusive method or any restricted group of reagents employable under the invention.

We claim:

1. A method of treating sulphur ores, containing free sulphur, to recover a purified sulphur and fertilizer materials which comprises treating the ore to produce a dewatered flotation concentrate thereof, heating to the melting point of sulphur and agitating the concentrate in the presence of insoluble phosphates and a sufficient amount of sulphuric acid to solubilize at least a portion of the phosphate and to agglomerate the phosphate and gangue of the ore into firm, self-sustaining spheroidal agglomerates of from approximately 1/64 inch to 1/8 inch in diameter, treating the resultant mass to separate liquid purified sulphur and nodulated material having avoidable fertilizing value.

2. A method of treating sulphur ores, containing free sulphur, to recover a purified sulphur and fertilizer materials which comprises treating the ore to produce a concentrate enriched in sulphur, heating to the melting point of sulphur and agitating the concentrate in the presence of material containing tri-calcium phosphate and a sufficient amount of sulphuric acid to convert the tri-calcium phosphate to available phosphate, the acid being in sufficient excess to effect agglomeration of the available phosphates into individually distinct nodular masses.

3. A method of treating sulphur ores, containing free sulphur, to obtain a purified sulphur and fertilizer material which comprises treating the ore to produce a concentrate enriched in sulphur, heating at least to the melting point of sulphur and agitating the concentrate in the presence of material containing insoluble potassium compounds together with a sufficient amount of sulphuric acid to solubilize at least a portion of the potassium compound and to agglomerate such compound and the gangue of the ore into firm, self-sustaining spheroidal agglomerates of at least 1/64 inch in diameter, treating the resulting mass to separate liquid purified sulphur and a nodulated fertilizer material containing available potassium.

4. A method of treating sulphur ores, containing free sulphur, to obtain a purified sulphur and fertilizer material which comprises treating the ore to produce a concentrate enriched in sulphur, heating at least to the melting point of sulphur and agitating the concentrate in the presence of material containing insoluble potassium compounds together with a sufficient amount of sulphuric acid to solubilize at least a portion of the potassium compound and to agglomerate such compound and the gangue of the ore into firm, self-sustaining spheroidal agglomerates of from approximately 1/64 inch to 1/2 inch in diameter, treating the resulting mass to recover a purified sulphur and a nodulated fertilizer material containing available potassium and elemental sulphur.

5. A method of treating sulphur ores, containing free sulphur, to recover a purified sulphur and fertilizer materials which comprises treating the ore to produce a dewatered flotation concentrate thereof, heating at least to the melting point of sulphur and agitating the concentrate in the presence of insoluble potassium compounds and a sufficient amount of sulphuric acid to solubilize at least a portion of the compound and to agglomerate such compound and the gangue of the ore into firm, self-sustaining agglomerates of at least 1/64 inch in diameter, treating the resulting mass to separate liquid purified sulphur and a nodulated material having a fertilizer value.

6. A method of treating off-colored free sulphur to decolorize such sulphur and recover valuable by-products which comprises agitating the sulphur in molten condition in the presence of a predetermined quantity of insoluble phosphate and a sufficient amount of sulphuric acid to solubilize at least a portion of the phosphate and to agglomerate the phosphate and gangue of the ore into firm, self-sustaining spheroidal particles of from approximately 1/64 inch to 1/8 inch in diameter and treating the resulting mass to separate and recover a decolorized sulphur and nodulated material having a fertilizer value.

7. A method of treating off-colored free sulphur to decolorize such sulphur and recover valuable by-products which comprises agitating the sulphur in molten condition in the presence of a predetermined quantity of insoluble phosphate and a sufficient amount of 98% sulphuric acid to solubilize at least a portion of the phosphate and to agglomerate the phosphate and gangue of the ore into firm, self-sustaining spheroidal particles of from approximately 1/64 inch to 1/8 inch in diameter and treating the resulting mass to separate and recover a decolorized sulphur and nodulated material having a fertilizer value.

8. A method of treating sulphur ores containing free sulphur, to obtain a purified sulphur and a fertilizer material which comprises treating the ore to produce a concentrate enriched in sulphur, heating at least to the melting point of sulphur and agitating the concentrate in the presence of a material containing an insoluble compound having a potential fertilizer value, chosen from the group consisting of insoluble phosphate and insoluble potassium compounds together with a sufficient amount of sulphuric acid to solubilize at least a portion of the said insoluble compound and to agglomerate such compound and the gangue of the ore into firm, spherodial agglomerates of from approximately 1/64 inch to 1/2 inch in diameter, treating the resulting mass to separate a purified sulphur and a nodulated material containing available fertilizer values.

9. A method of treating sulphur ores, containing free sulphur, to recover a purified sulphur and fertilizer materials which comprises treating the ore to produce a concentrate enriched in sulphur, heating to the melting point of sulphur and agitating the concentrate in the presence of a material containing tricalcium phosphate and a sufficient amount of sulphuric acid to convert the tricalcium phosphate to available phosphate, the acid being in sufficient excess to effect agglomeration of the available phosphate and the gangue into individually distinct nodular masses of from approximately 1/64 inch to 1/8 inch in diameter.

ARTHUR B. MENEFEE.
HERBERT H. GREGER.

REFERENCES CITED

The following references are of record in the file of this patent:

UNITED STATES PATENTS

| Number | Name | Date |
|---|---|---|
| 1,457,793 | Perry | June 5, 1923 |
| 1,990,602 | Guernsey | Feb. 12, 1935 |
| 1,656,505 | Schwab | Jan. 17, 1928 |
| 2,161,035 | Gilbert | June 6, 1939 |
| 2,287,759 | Hardesty et al. | June 23, 1942 |